(12) United States Patent
Morrison et al.

(10) Patent No.: US 8,793,871 B2
(45) Date of Patent: Aug. 5, 2014

(54) PROCESS FOR MAKING A WALL WITH A POROUS ELEMENT FOR COMPONENT COOLING

(75) Inventors: Jay A. Morrison, Cocoa, FL (US); Raymond G. Snider, Orlando, FL (US); Allister W. James, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 481 days.

(21) Appl. No.: 13/050,057

(22) Filed: Mar. 17, 2011

(65) Prior Publication Data
US 2012/0237786 A1    Sep. 20, 2012

(51) Int. Cl.
*B21K 25/00*    (2006.01)
(52) U.S. Cl.
USPC .............................. 29/889.2; 29/897; 29/527.5
(58) Field of Classification Search
USPC .................. 29/889.2, 889.7, 889.71, 889.72, 29/889.721, 897, 897.1, 897.31, 527.5, 29/527.1, 530, 897.2
See application file for complete search history.

(56) References Cited

U.S. PATENT DOCUMENTS

| | | | |
|---|---|---|---|
| 4,148,350 A | 4/1979 | Rossmann | |
| 4,629,397 A | 12/1986 | Schweitzer | |
| 6,235,370 B1 | 5/2001 | Merrill et al. | |
| 6,412,541 B2 | 7/2002 | Roesler et al. | |
| 6,709,771 B2 | 3/2004 | Allister | |
| 7,141,812 B2 | 11/2006 | Appleby et al. | |
| 7,402,335 B2 | 7/2008 | Bolms et al. | |
| 7,670,675 B2 | 3/2010 | Heselhaus | |
| 2009/0196761 A1 | 8/2009 | James | |
| 2010/0054930 A1* | 3/2010 | Morrison | ...................... 415/191 |

FOREIGN PATENT DOCUMENTS

WO    WO/03/006883 A1    1/2003

OTHER PUBLICATIONS

"Nial Alloys for Turbine Airfoils"; R. Darolia, W., et. al.; 1996; GE.*

* cited by examiner

*Primary Examiner* — Ryan J Walters

(57) ABSTRACT

A structural layer (30) may be bi-cast onto ligaments (62) extending from a porous cooling construction (20). The material of the structural layer may be optimized for high-temperature strength, while the material of the porous construction may be optimized for high thermal conductivity. A fugitive material (56) such as wax may be formed on the ligaments of the porous construction. A second fugitive material (58) such as ceramic may fill the remaining part of the porous construction. An investment casting shell (60) may be disposed around the porous construction and the fugitive materials. The first fugitive material may then be replaced with the material of the structural layer (30), and the second fugitive material may be removed to provide coolant paths (26). A second structural layer (52) may be bi-cast onto further ligaments (62) on a second side of the porous construction.

11 Claims, 6 Drawing Sheets

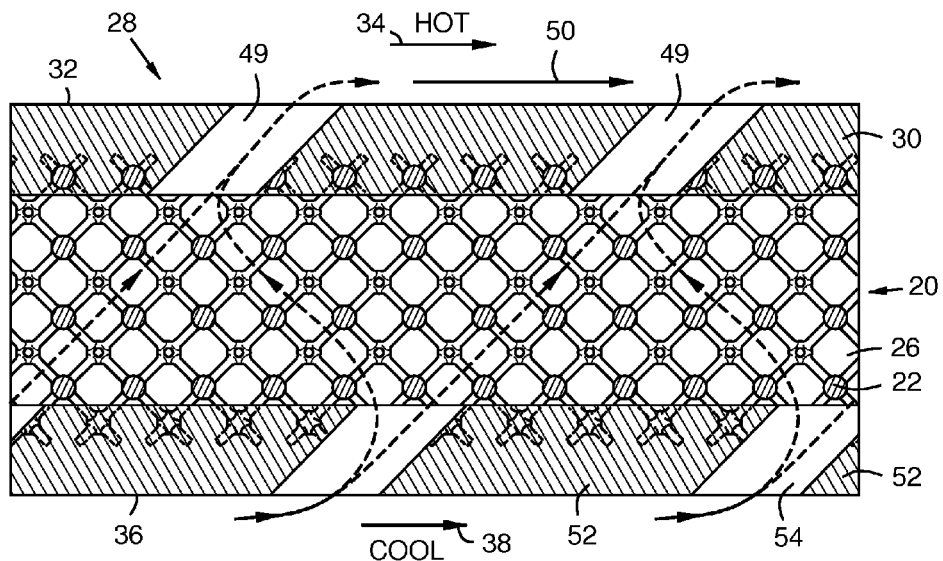
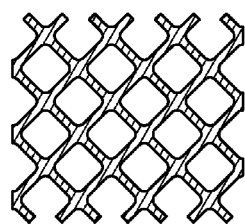
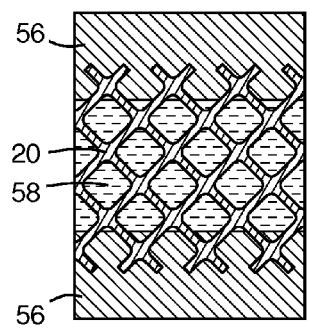

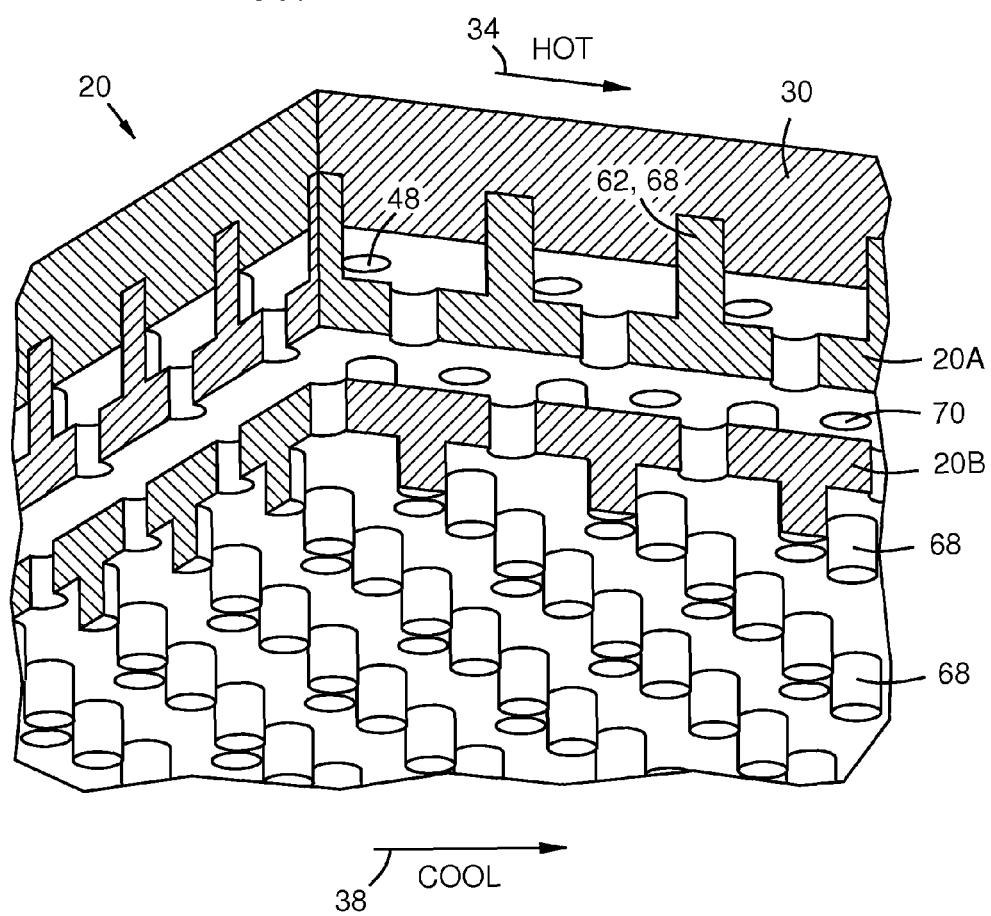

PROCESS FOR MAKING A WALL WITH A POROUS ELEMENT FOR COMPONENT COOLING

FIELD OF THE INVENTION

This invention relates to walls with porous elements for component cooling, particularly in turbine engines.

BACKGROUND OF THE INVENTION

Cooling of components such as gas turbine blades has been done by routing cooling air through channels in the component; passing the coolant through pores in the outer walls for film cooling; passing the coolant along interior surfaces of the walls for near-wall cooling; and/or directing jets of the cooling air against the walls for impingement cooling.

In addition, porous constructions have been formed on component walls to thermally couple the coolant to the wall. Methods of manufacturing porous constructions for this purpose have included casting, selective metal sintering or melting (SLS, SLM), and others. The porous element may be formed separately and then bonded to the structural wall, or a porous element may be formed integrally with a wall in a single process. Examples of prior methods are found in U.S. Pat. No. 7,670,675.

Prior methods did not provide different materials for the porous cooling elements and the structural elements of a component. This constrained optimization of a porous element for its intended cooling function if materials optimized for a high-temperature structural wall are also used for the porous element. However, bonding different materials is challenged by differential thermal expansion when the bond is exposed to large temperature variations as in a gas turbine.

BRIEF DESCRIPTION OF THE DRAWINGS

The invention is explained in the following description in view of the drawings that show:

FIG. 5 is a sectional view of a wall sandwich structure with porosity and film cooling.

FIG. 6 schematically illustrates a porous construction with high thermal conductivity.

FIG. 7 shows wax or other fugitive material on the porous construction of FIG. 6 where bi-cast layers will be formed, and ceramic or other fugitive material within the porous construction where coolant passages will be provided.

FIG. 15 shows an outer structural layer bi-cast onto the porous construction of FIG. 14.

DETAILED DESCRIPTION OF THE INVENTION

Figure 1:
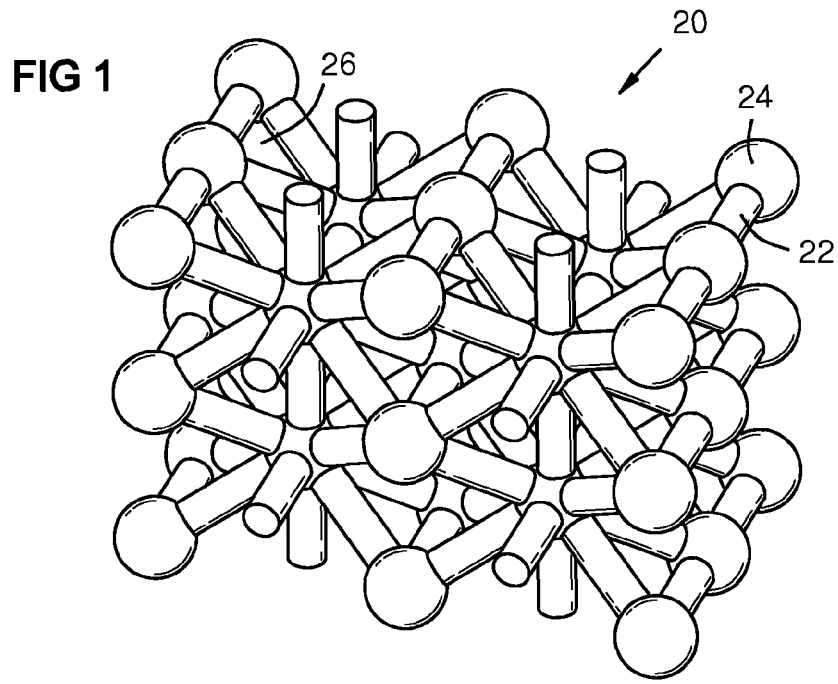
FIG. 1 is a perspective view of a porous construction.

FIG. 1 shows a discrete porous construction 20 that may be used for cooling in the invention. The term "discrete" in this context means a construction with a geometry that is engineered and determinate, rather than random as with foam. Advantages of discrete porous constructions over random ones include strength, rigidity, and uniformity. A lattice geometry as in FIG. 1 is not a requirement of the invention, but is just one example of a discrete porous construction. It may comprise links 22 interconnected at nodes 24, providing passages 26 between the links. Such a construction may be formed by selective layer sintering or melting (SLS/SLM) or by other processes such as casting methods described in U.S. Pat. No. 7,141,812 of Mikro Systems Inc.

Figure 2:
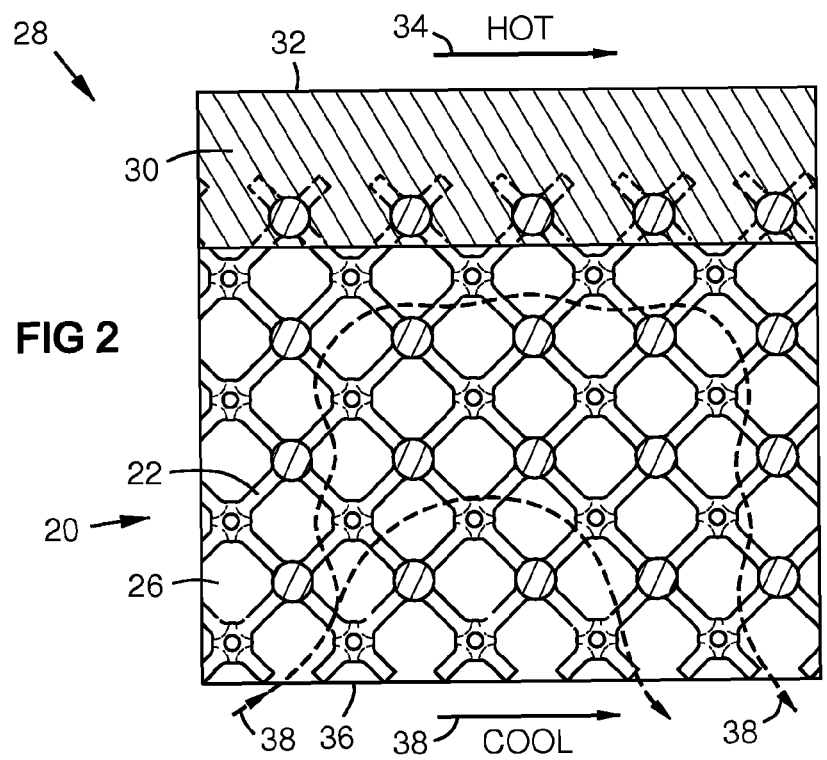
FIG. 2 is a sectional view of a wall layer bi-cast onto the porous construction.

FIG. 2 shows a portion of a wall 28 formed by bi-casting a first structural layer 30 onto a porous construction 20. A first surface 32 of the wall 28 is exposed to a hot fluid 34, such as combustion gas. An opposed surface 36 of the wall is exposed to a cooling fluid 38 such as compressed air, which filters through the porous construction by forced convection. The wall 28 may be a wall of a turbine component such as a blade, vane, shroud, combustor liner, or transition duct. For example the first surface 32 may be the exterior surface of a turbine blade, and the opposed surface 36 may be an interior surface of the blade in a cooling channel.

Figure 3:
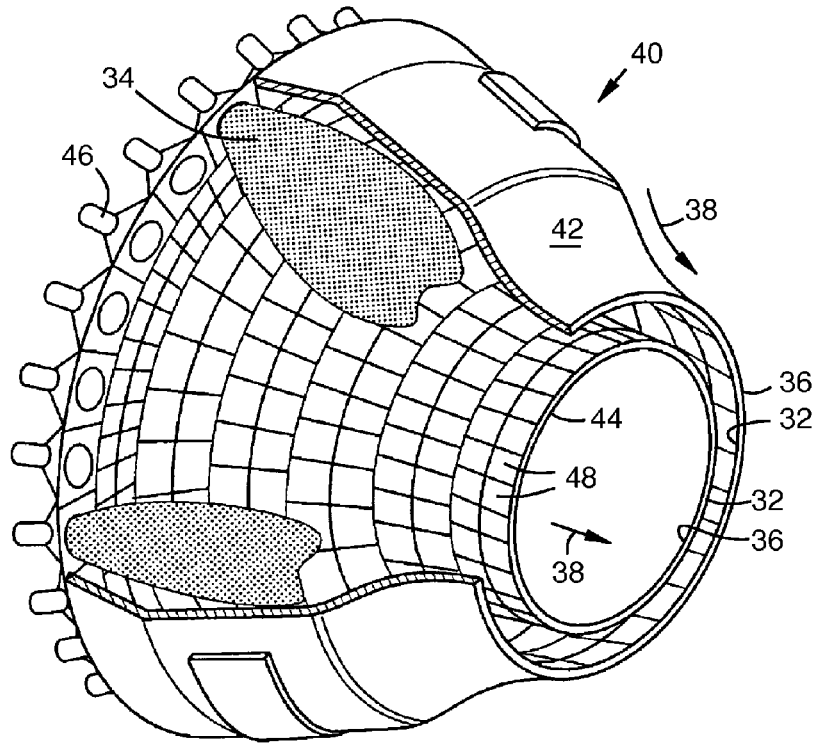
FIG. 3 is a perspective view of an annular combustion chamber.

FIG. 3 shows an annular combustion chamber 40 with a radially outer wall 42, a radially inner wall 44, and an annular array of burners 46. The combustion gas 34 flows between the outer and inner walls 42, 44. These walls may be assembled in segments 48, each of which is fabricated according to aspects of the invention. However, the illustrated segmentation is not limiting. Instead, the walls 42, 44 may be formed in annular portions, 180° portions, or any other portions. Each wall 42, 44 has a first surface 32 exposed to the combustion gas 34. A second surface 36 is exposed to cooling air 38 from the turbine compressor via coolant flow paths such as a plenum around the combustor and channels radially inside the combustor. The coolant 38 does not necessarily flow in the same direction as the combustion gas 34.

Figure 4:
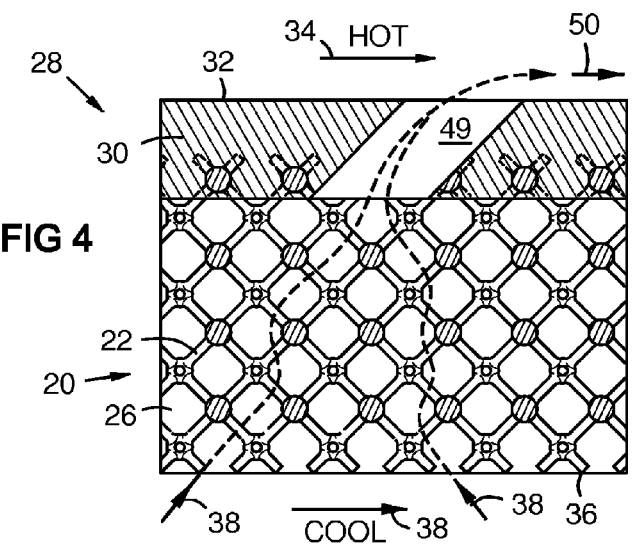
FIG. 4 is a sectional view of a wall structure with porosity and film cooling.

FIG. 4 shows a structural layer 30 bi-cast onto a porous construction 20. Film cooling holes 49 may be formed or drilled into the structural layer 30, to provide a film of cooler air 50 on the first heated surface 32.

FIG. 5 shows a first structural layer 30 bi-cast onto a porous construction 20. Film cooling holes 49 may be formed or machined into the structural layer 30, to provide a film of cooler air 50 on the first heated surface 32. A second structural layer 52 is bi-cast onto the cool side of the porous construction 20. Coolant inlet holes 54 may be formed or machined into the second structural layer 52. The second structural layer 52 may be formed of the same material as the first structural layer 30, or the material of the porous construction 20, or a different material. If the second structural layer uses the same material as the porous construction they will have the same thermal conductivity and thermal expansion coefficients.

FIGS. 6 to 13 show fabrication steps as follows:

FIG. 6—Fabricate a porous construction 20 of a material optimized for high thermal conductivity.

FIG. 7—Form a first fugitive material 56 such as wax on the porous construction. The wax may define a finished geometry of the structural layer(s). Fill the interior of the porous construction with a second fugitive material such as a pourable ceramic core 58.

Figure 8:
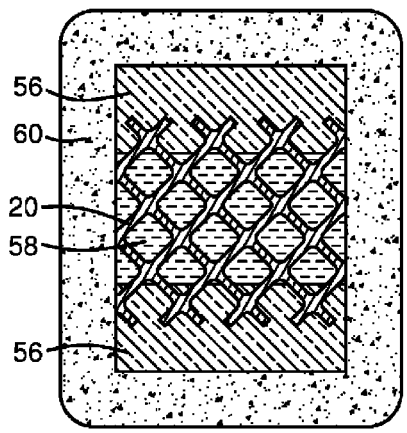
FIG. 8 shows an investment casting shell on the assembly of FIG. 7.

FIG. 8—Encase the assembly of FIG. 7 in an investment casting shell 60.

Figure 9:
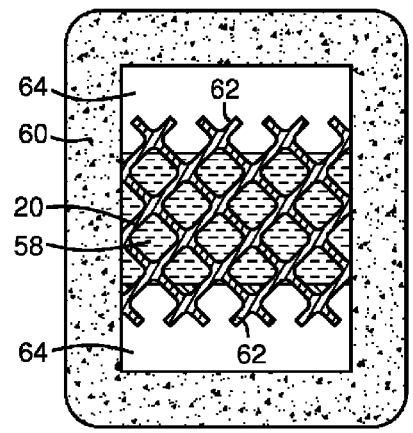
FIG. 9 shows the wax removed, exposing ligaments of the porous construction for anchors in the bi-casting.

FIG. 9—Remove the wax, exposing ligaments 62 of the porous construction 20 in voids 64 left by the wax.

Figure 10:
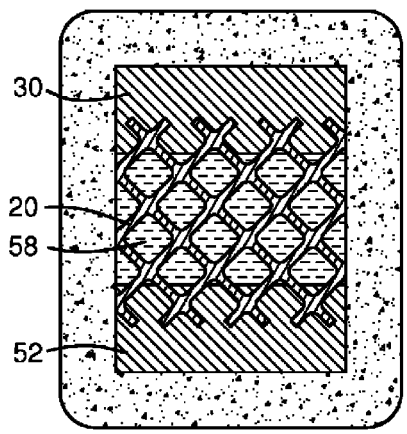
FIG. 10 shows structural layers bi-cast onto the exposed ligaments.

FIG. 10—Bi-cast structural layers 30, 52 onto the exposed ligaments 62.

Figure 11:
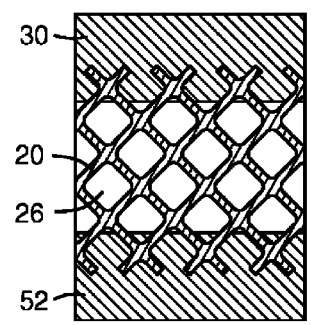
FIG. 11 shows the result of removing the casting shell and the ceramic core to leave a wall structure according to aspects of the invention.

FIG. 11—Remove the casting shell 60 and the ceramic core as known in the casting arts. This leaves a wall structure 28 according to aspects of the invention.

Figure 12:
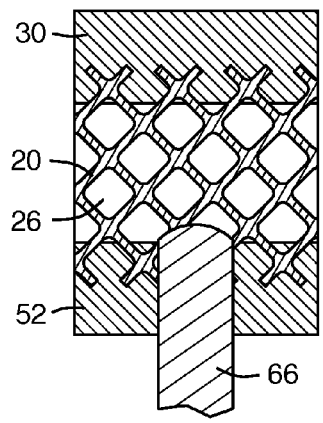
FIG. 12 shows milling of a hole in a structural layer for a coolant inlet or exit.

FIG. 12—If holes are wanted in the structural layer(s) they may be formed by ceramic inserts (not shown) in the wax of FIG. 7, or they may be milled 66 as shown or by other known means.

Figure 13:
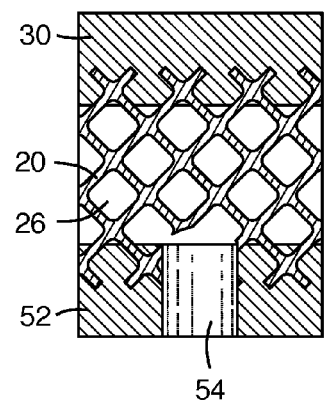
FIG. 13 shows a wall structure after milling per FIG. 12.

FIG. 13—This leaves a wall structure 28 with coolant holes 54 as needed.

The structural element(s) 30, 52 may be formed using known structural alloys, which alleviates qualification of a new material system. The porous construction 20 may be made of a different material optimized for high thermal conductivity, such as Monels and MoRe or MoNb alloys. The material for the porous construction may be constituted to have at least 50% greater thermal conductivity in W/mK than the material of the first structural element 30. The material for the porous construction may further be constituted to have at least twice the thermal conductivity in W/mK of the material of the first structural element 30. For example, Monel® K500 material has a thermal conductivity of 34.6 W/mK at 650° C., which is twice the thermal conductivity of a conventional structural Ni-based superalloy. The porous construction 20 is not directly exposed to the hot gas 34, so it does not require the same heat tolerance as the first structural element 30. Specialization of materials combines structural integrity, heat tolerance, and thermal efficiency. Bi-casting anchors the porous construction 20 to the structural element(s) 30, 52, providing durable interconnection of two different materials despite large temperature changes and gradients.

A metallurgical bond between the porous construction 20 and the structural elements 30, 52 may be promoted by means such as:

1) Bi-casting in an environment of inert gas or a vacuum to prevent formation of oxide scale that impairs bonding. A hydrogen environment may be used to prevent oxide scale formation and to reduce sulphur content in the bi-casting.

2) The porous construction may be coated with a wetting agent or flux. At elevated temperatures the flux removes oxide and provides a clean surface to promote metallurgical bonding.

Figure 14:
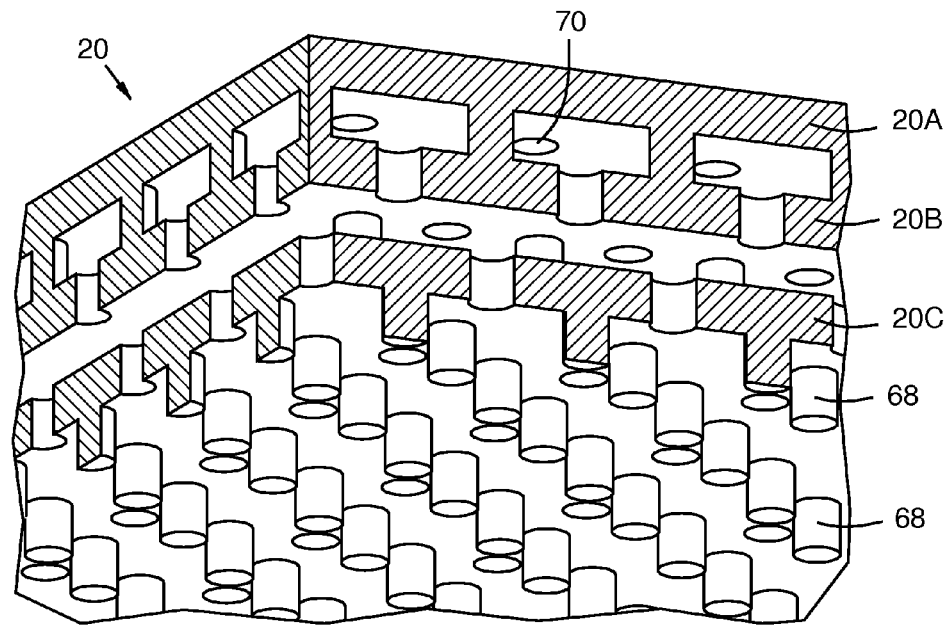
FIG. 14 shows another embodiment of a porous construction.

FIG. 14 shows a porous construction 20 that may be created by an additive process such as selective layer sintering. Alternately, each layer 20A, 20B, 20C may be formed separately and bonded to adjacent layers by diffusion bonding or other means. The layers 20A, 20B, 20C may comprise a gradation of materials and properties. For example, layers 20B and 20C may be made of materials with progressively higher thermal conductivity than layer 20A. Each layer may have a plurality of coolant passage holes 70. Columns 68 or other spacing structures may interconnect the layers, and may extend as ligaments 62 for anchoring the porous construction 20 to a bi-cast structural layer as shown in FIG. 15.

The term "final material" may be used in some of the claims to distinguish final product materials from fugitive materials used in the manufacturing process.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A manufacturing process, comprising:
constituting a first material optimized for structural properties;
constituting a second material with a higher thermal conductivity than the first material;
forming a porous construction of the second material;
bi-casting a first layer of the first material onto a first side of the porous construction, wherein a first portion of the porous construction becomes disposed within the first layer and a second portion of the porous construction remains outside the first layer; and
bi-casting a second layer on a second side of the porous construction, wherein ligaments of the porous construction become disposed within the second layer, and the second portion of the porous construction is disposed between the first and second layers.

2. The manufacturing process of claim 1, further comprising constituting the second material to have at least 50% greater thermal conductivity than the first material.

3. The manufacturing process of claim 2, further comprising:
constituting the first material to form a Ni-based superalloy;
forming a turbine component comprising a wall comprising the first layer; and
providing a coolant flow path through the second portion of the porous construction.

4. The manufacturing process of claim 3, further comprising constituting the second material to have at least twice the thermal conductivity of the first material.

5. The manufacturing process of claim 1, further comprising forming the porous construction as a lattice of intersecting links in a geometry that is engineered and determinate.

6. The manufacturing process of claim 1, further comprising forming film cooling exit holes in the first layer and coolant inlet holes in the second layer.

7. The manufacturing process of claim 1, further comprising forming the second layer of the first material.

8. The manufacturing process of claim 1, further comprising forming the second layer of the second material.

9. A manufacturing process comprising:
fabricating a porous construction of a second final material;
disposing a first layer of a first fugitive material on ligaments extending from a first side of the porous construction;
filling interior voids of the porous construction with a second fugitive material;
encasing the porous construction and the fugitive materials in an investment casting shell;
removing the first fugitive material, exposing the ligaments of the porous construction;
bi-casting a first final material onto the exposed ligaments to form a first structural layer; and
removing the casting shell and the second fugitive material.

10. The manufacturing process of claim 9, further comprising constituting the second final material to have at least 50% greater thermal conductivity than the first final material.

11. The manufacturing process of claim 10, further comprising:
- disposing a second layer of the first fugitive material on further ligaments extending from a second side of the porous construction;
- after removing the first fugitive material, bi-casting an additional layer of the second final material onto the further ligaments to form a second structural layer on the second side of the porous construction;
- forming coolant inlet holes in the second structural layer; and
- forming film cooling holes in the first structural layer.

* * * * *